J. M. LANSDEN, Jr.
MOTOR VEHICLE.
APPLICATION FILED APR. 16, 1909.
1,147,411.
Patented July 20, 1915.
4 SHEETS—SHEET 3.
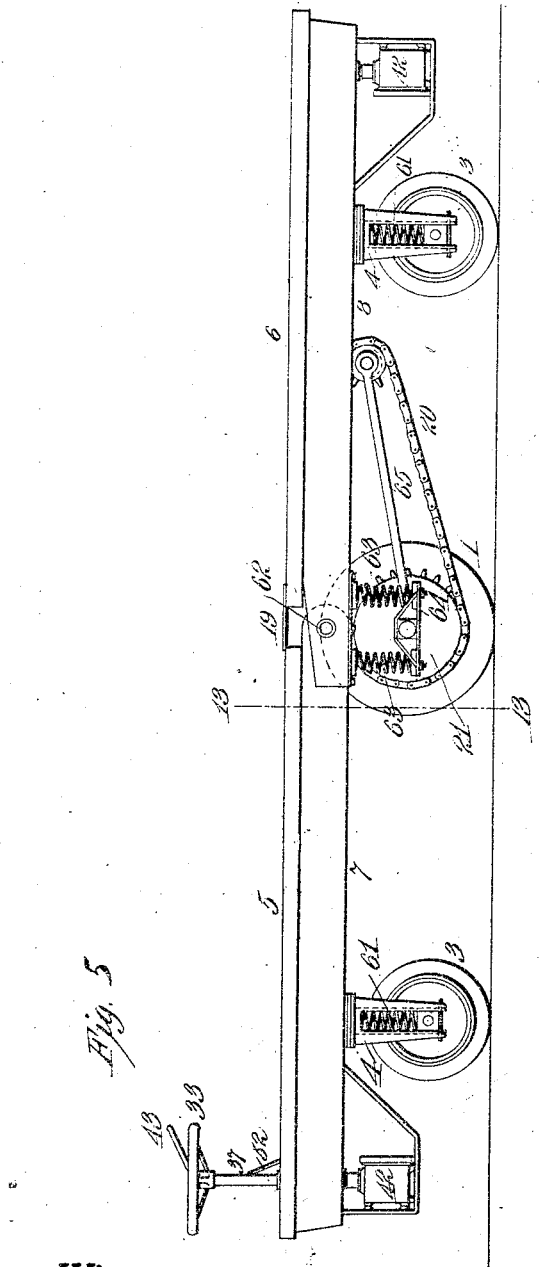
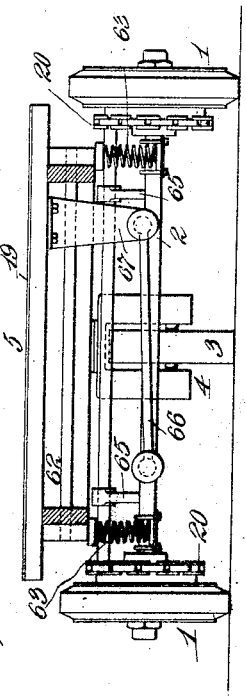
Witnesses:
Jas. F. Coleman
John P. Potch
Inventor
John M. Lansden Jr.
By Dyer & Dyer
Attorneys.

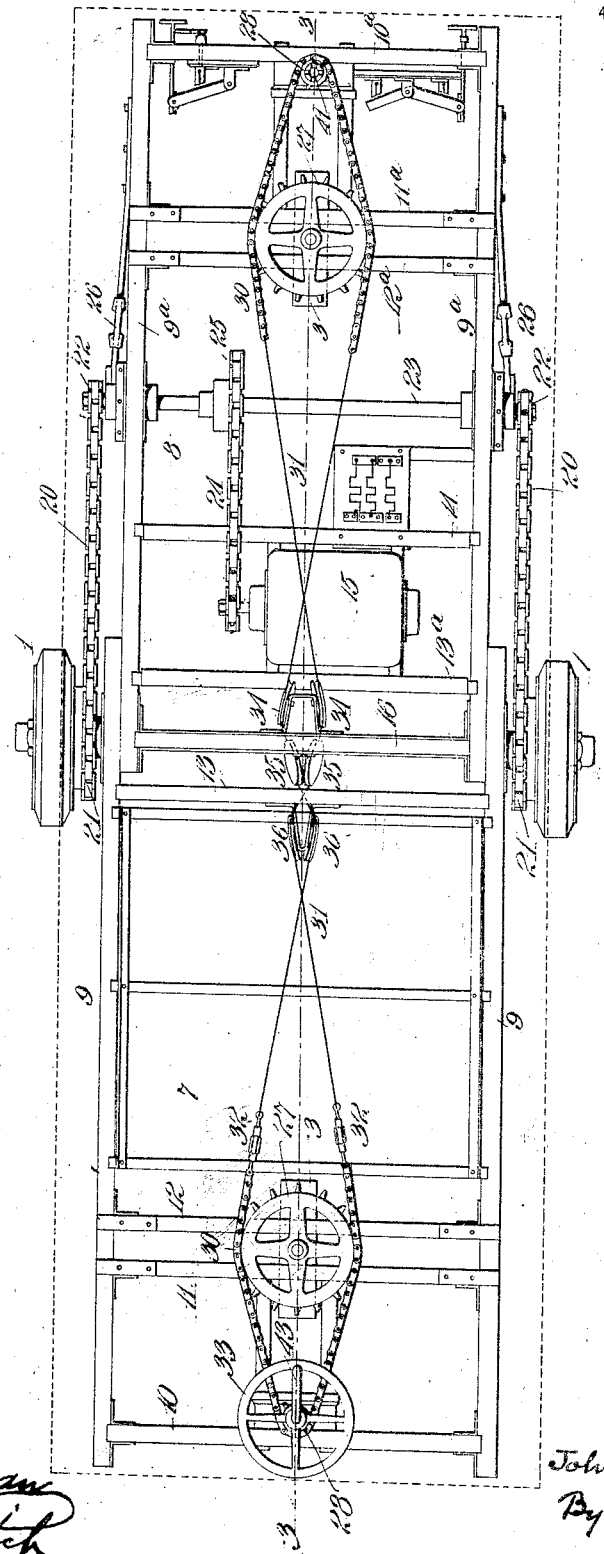

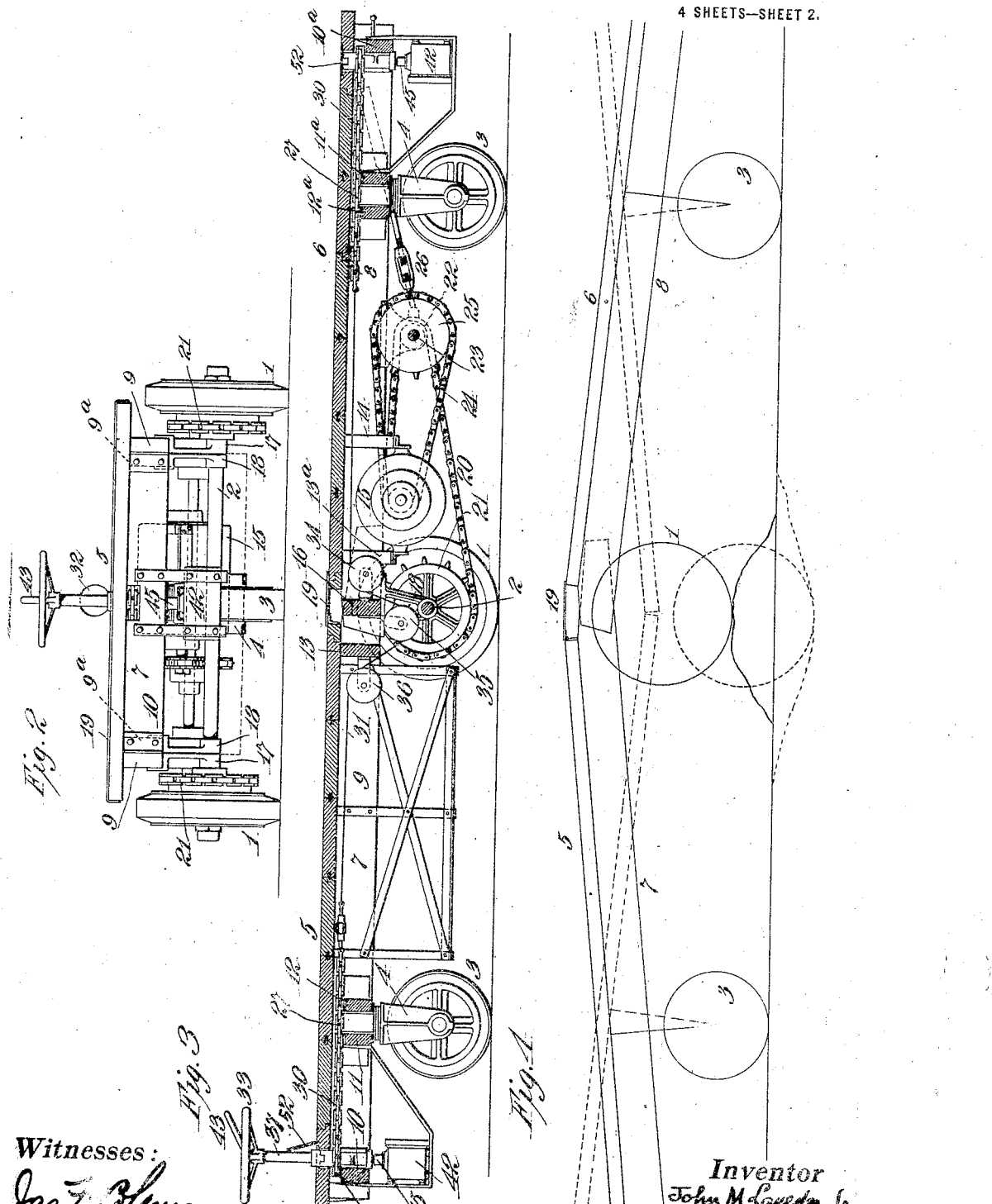

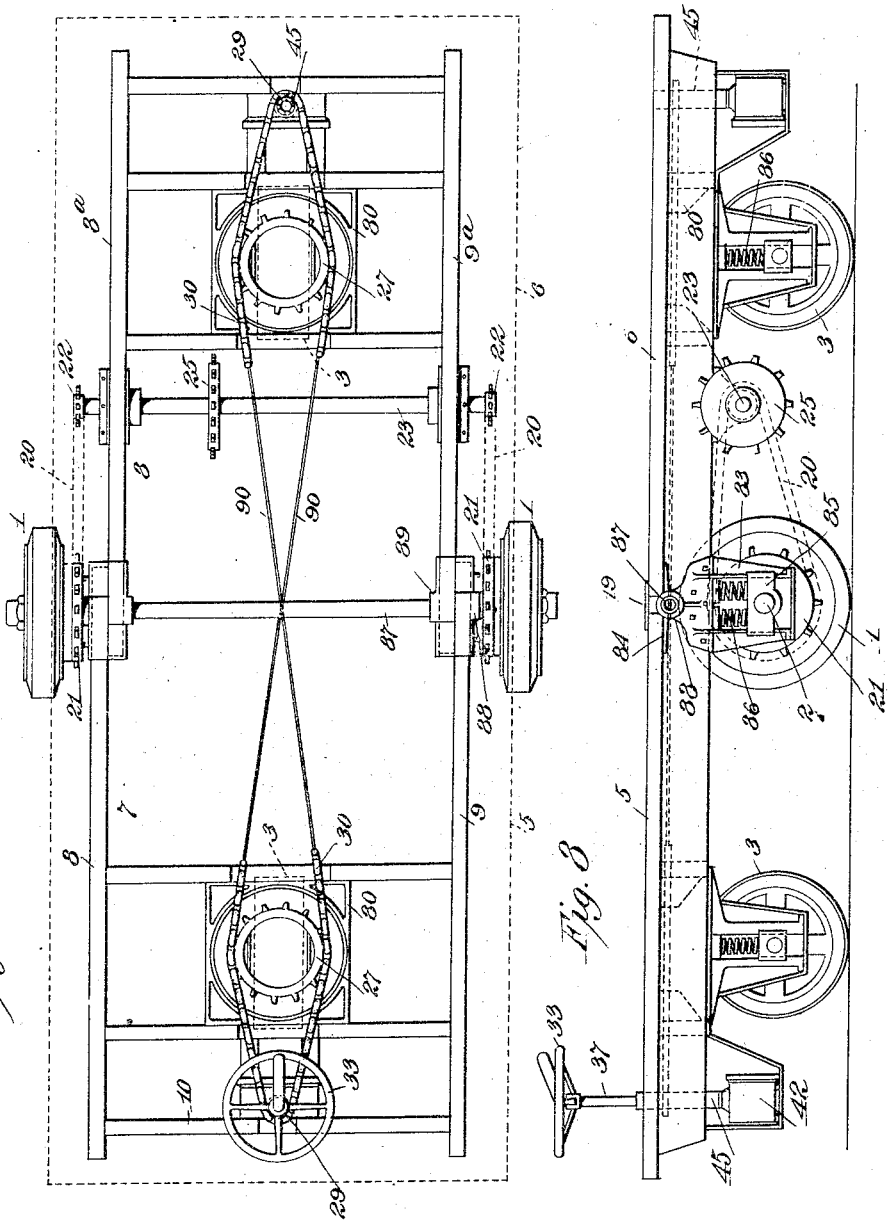

UNITED STATES PATENT OFFICE.

JOHN M. LANSDEN, JR., OF NEWARK, NEW JERSEY.

MOTOR-VEHICLE.

1,147,411.  Specification of Letters Patent.  Patented July 20, 1915.

Application filed April 16, 1909. Serial No. 490,425.

*To all whom it may concern:*

Be it known that I, JOHN M. LANSDEN, Jr., a citizen of the United States, and a resident of the city of Newark, county of Essex, and State of New Jersey, have invented a new and useful Motor-Vehicle, of which the following is a specification.

The object I have in view is the production of a motor vehicle, which shall always be evenly supported upon four points irrespective of the character of the ground.

Further objects are to produce a motor vehicle which may be easily and readily maneuvered and capable of turning about a short radius.

Further objects are to produce a motor vehicle which will be simple, immensely strong and which when used for trucking purposes can be made very low.

These and further objects will appear from the embodiments of my invention set forth in following specification and accompanying drawings, considered together or separately.

I attain these objects by the mechanism illustrated in the accompanying drawings, in which—

Figure 1 is a plan view of the chassis, Fig. 2 is a front view of the truck, Fig. 3 is a sectional view on the line 3—3 of Fig. 1, Fig. 4 is a diagrammatical view showing the position of the frame when encountering obstacles, Fig. 5 is a side elevation of a modification showing a four wheel spring truck; Fig. 6 is a section on the line 13—13 of Fig. 5; Fig. 7 is a plan view of the portion of a chassis embodying a modified form of the invention the platform being shown in dotted lines; and Fig. 8 is an elevation of the same with the near wheel removed.

In all the views, like parts are designated by the same reference characters.

The embodiment illustrated represents various forms of an electrically propelled motor vehicle, but it is apparent that the propelling means, shown in the illustrations, form no part of my present invention and that the motor vehicle may have an operating engine working on the internal or external combustion principle. Some parts of my invention are applicable to a vehicle in which no motor is used, such being pulled or pushed by outside power.

I will first describe my invention in connection with the embodiment illustrated in Figs. 1, 2, 3 and 4. This truck is shown as having four wheels. The two driving wheels 1—1 are carried upon a shaft 2, and in the embodiment illustrated, rotate thereon. The two steering wheels 3—3 are arranged one at each end of the chassis and are mounted in forks 4—4 which turn in vertical bearings carried by the chassis. The forks are turned in the bearings so as to effect the steering. I prefer to turn the forks in the bearings simultaneously in opposite directions for the purpose of effecting the steering by means which will be subsequently described in this specification.

The platform is made in two sections, a section 5, which I will hereinafter refer to as the front section, and a section 6, which I will hereinafter refer to as the rear section. These sections of the platform are carried upon corresponding chassis sections 7 and 8, which I will hereinafter refer to as the front chassis section and the rear chassis section respectively. The two chassis sections with their respective sections of platform are pivoted together on a horizontal pivot, which in the embodiment illustrated is coincident with the shaft or axle 2. This arrangement of the chassis in two parts pivoted together on a horizontal axis, produces a structure which will run over any inequalities in the road. This is illustrated in Fig. 4. If the driving wheels 1—1 strike an obstruction in the form of an elevation, as shown in full lines of Fig. 4, the chassis will be buckled up in the middle, as in the position illustrated. If the supporting wheels strike an obstruction in the form of a depression, as shown in the broken lines, the chassis will sag in the middle, as shown. It is understood, of course, that the same results will follow if either or both of the steering wheels should strike obstructions in the form of elevations or depressions. In other words, whatever the irregularity of the ground may be on which the truck is traveling, the chassis will bend to compensate for these irregularities and all four of the wheels will be supported on the ground.

The support of the chassis upon the driving wheels is secured by the following means: Referring to Fig. 1, it is seen that the front chassis section is formed of parallel side members 9—9' and cross members 10, 11, 12 and 13, producing a rectangular frame. The rear chassis section is composed of practically identical side members $9^a$ $9^a$ and cross members $10^a$ $11^a$ $12^a$ and $13^a$.

An additional cross member 14 is arranged intermediate the cross members 12ª and 13ª and forms one support for the motor 15; the other support is formed by means of the cross member 13ª. An additional cross member 16 connects the parallel side members 9ª 9ª at a point adjacent to their ends. The cross member 13 of the front section is some distance from the rear of that section and the parallel side members of this section being separated to a sufficient extent an opening is formed thereby in which the rear chassis section lies, as shown in Fig. 1. To state the matter in different words, the parallel side members of the two sections overlap, and this overlapping occurs immediately above the shaft 2.

Referring to Fig. 2, the parallel side members 9 carry depending brackets 17 with bearings in their lower ends through which the shaft 2 passes. The parallel side members 9ª 9ª of the rear chassis section carry depending brackets 18 also with bearings in their lower extremities through which the shaft 2 passes. These two brackets lie side by side, as shown in Fig. 2. By this arrangement, each section of the chassis is held in relation to the shaft by means of the depending brackets, and the two sections of the chassis are thus tied together in such a manner that the two sections can oscillate or change their relative positions to satisfy any inequalities in the ground.

For the purpose of closing up the interval between the adjacent or abutting ends of the two platform sections, one is provided with a plate 19 which extends across the width of the platform, and is hinged to one platform section and rests on the edge of the other platform section. The width of the plate measured in the direction of the longitudinal axis of the car is sufficiently great so that it will always cover the gap between the two sections when the platform is distorted to the maximum extent by the elevation of its center.

Any suitable means may be used for driving the wheels 1—1: that illustrated comprising side chains 20—20 which engage with sprockets 21 on the driving wheels 1—1, and with sprocket pinions 22 on the differential shaft 23. This shaft is mounted in bearings carried by the rear chassis section 8. A chain 24 connects the sprocket pinion on the motor 15 to a sprocket wheel 25 connected to the differential shaft 23. The usual differential is provided on this shaft and the chains 20 are adjusted for wear by sliding the bearing boxes of the differential shaft 23 by means of turn-buckles 26 on the spacing rods. The chain 24 may be adjusted for wear by moving the motor in its supports in any wellknown manner. By this system of driving, the distortions of the chassis, owing to inequalities of the ground as described, will not affect the driving mechanism, but such mechanism will work equally well in any situation where the ground is not exactly level.

For the purpose of steering the vehicle, I provide means for simultaneously turning the two steering wheels in opposite directions to equal extent. I also preferably arrange this to be actuated from either end of the platform so that the device will run equally well in either direction. The steering mechanism comprises an arrangement of chains and sprocket wheels, the sprocket wheels being on the steering forks 4—4 and the chains pass around these sprocket wheels and are connected by wire ropes or similar devices, such ropes being crossed at some point so that the two wheels will turn in synchronism, but in opposite directions.

A hand-wheel steering shaft with a sprocket pinion is provided at each end of the car and the bight of the chain passes around the pinion. Either of these pinions may be actuated by means of a single steering shaft and wheel, which I prefer to make interchangeable and use it at either end of the car, depending on the direction of travel of the latter.

The details of the mechanism are as follows:—A sprocket wheel 27, is secured to the fork 4—4 of each steering wheel. The sprocket pinion 28 is secured in the same horizontal plane as the sprocket wheel 27 to a vertical shaft arranged in bearings at each end of the chassis. A chain 30 arranged at each end of the chassis is looped around the sprocket wheel 27 and the bight of the chain passes around the sprocket pinion 28. The free ends of the opposite chains are secured together by wire ropes 31 which are crossed in the middle so that the two sprocket wheels 27 turn in opposite directions. Slackness of the wire ropes is taken up by turn br les 32, which also provide means for adjustment for wear in the chains. It is apparent that on rotating the shaft 37 by means of a hand-steering wheel 33, the leading wheel 3 will be turned in one direction and the trailing wheel 3 to the same extent in the opposite direction, thus pivoting the car around its central support, i. e. the supporting wheels 1—1.

It will be apparent that if the wire ropes 31 extended across the chassis immediately under the platform in the same horizontal plane as the chains 30—30, the ropes would become unduly slack upon flexing of the platform caused by the sinking of the driving wheels below the level of the steering wheels and would be stretched and broken upon the flexing of the chassis caused by the driving wheels being elevated above the level of the steering wheels. I overcome this difficulty by looping the wire ropes around a point coincident with the center of pivot of the two sections of the chassis. This mechanism is best shown in Figs. 1 and 3. I provide two pulleys 34—34 carried in bearings supported in brackets on the cross piece 16 of the rear chassis section. The two sections of the wire rope leading from the ends of the chain run over these two pulleys and pass under two other pulleys 35—35, carried in brackets below the cross piece 16. The periphery of the pulleys 35—35 is as close to the axle 2 as possible, so that the wire rope will be looped around a point as close to the center of the pivot of the two chassis sections as possible. The two wire rope sections then pass over the pulleys 36—36 which are carried in bearings secured to the cross member 13 of the front chassis section. It will be noted that the wires cross each other three times. As shown in Fig. 1, the first time from the rear of the car to the front, it is for the purpose of leading properly to the pulleys 34—34 and thence to the pulleys 35—35 and 36—36. The second turn is made for the purpose of securing the cross movements. The cross in the wires from the pulleys 36—36 is made for the purpose of getting a fair lead from the front chain to such pulleys 36—36. It will be apparent from the structure described that the bight of the wire being led to a point adjacent to the point of pivot of the two chassis sections, distortions in the chassis caused by inequalities in the road will have no material effect upon the tension of such wires, but they will remain in substantially uniform tension under all conditions.

In connection with the mechanism already described I provide a means whereby the vehicle may be controlled from either end, such means comprising a hand-steering wheel and an electric controlling gear. It is desirable that the controlling and steering mechanism be shiftable from one end of the vehicle to the other so that which becomes the rear end will be unobstructed and nothing exposed to be accidentally broken or tampered with.

The hand steering wheel 33 is carried on a shaft 37 which may engage a clutch member carried by either of the shafts 45—45 which project upward from the controller boxes 42.

For the purpose of closing the opening in the platform when the controller, handle and hand steering wheel are removed, I provide a hinged plate 52.

Figs. 5 and 6 are modifications in which the chassis is supported on wheels by means of springs.

The steering wheel boxes lie in slots in the forks and the chassis is supported by spiral springs 61. The pivot of the two chassis parts is at 62. The chassis is connected to the main shaft 2 by means of a set of spiral springs 63, such springs lying on each side of a bracket 64 carried by the main shaft 2. Both sets of springs are carried by the same chassis part, in the illustration, such part being the rear part.

In order to properly brace the chassis against endwise movements due to the fact that spiral springs have little stability, I provide distance bars 65, which lie parallel with the longitudinal axis of the car, and also serve to resist stresses caused by the driving chains. To resist stresses in the side direction, I provide a link 66, one end being pivoted to the axle 2, the other on a bracket 67 depending from the chassis. The ends of the link are in ball and socket joints so as to allow for small movements of the axle longitudinally of the truck.

The switches 73 and 74 as shown in Fig. 1, are located in certain electrical circuits of the truck, but since the electrical equipment forms no part of my invention it need not be herein described.

In Figs. 7 and 8 is shown an arrangement, in which springs may be employed with the axle boxes of the center wheels, said boxes being arranged to slide in pedestal guides. This arrangement does away with either the cross links 66 or the horizontal distance bar 65.

The pedestal guide 83, as shown in Fig. 8, forms an attachment to the front frame section 5 of the frame, being secured thereto by means of an arm or lip 84. The axle 2 is carried in a box 85, which slides in the pedestal guide, the weight of the center of the vehicle being sustained by the springs 86 located between the box 85 and the top of the guide.

The two frame sections are pivoted together at the point 87 which is close to the top of the platform instead of being coincident with the center of the axle 2, as in the other embodiments of the invention. The pivot 87, as shown, is in the form of a tube, and is parallel with the axle 2, but above the same. The ends of the tube 87 lie in supports or bearings 88 in the pedestal guide 83. Other bearings 89 are carried by the rear frame section 6. By this arrangement, the pivot point being close to the surface of the vehicle, the gap or opening between the two parts may be of less width than in the other embodiments described; and also when the parts are in the distorted position shown in full lines in Fig. 4, the gap or space will be of less width than in the structures previously described.

I show in Fig. 7, a modified form of steering device, which, in lieu of wires, utilizes rods 90. These rods are connected to the chain already described, and cross in the center, so as to secure the proper reverse motion of the steering wheels. An opening of sufficient width is formed in the tube 87, so that rods can pass through such tube. This avoids the necessity of the pulleys, already described in connection with the preceding embodiments.

While I have shown in all of the illustrated embodiments of the invention two center wheels, it is apparent that any number of wheels may be chosen from one up, the necessary stability being secured by the end wheels, which may be two or more in number at each end. It is also apparent that the driving wheels are not necessarily the middle wheels, as the structure may be modified so that this does not appear. It is also apparent that the number of chassis sections is not necessarily limited to two in number as the number can be increased to any desired extent.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now described my invention, what I claim as new and desire to secure by Letters Patent, is:—

1. A vehicle having a frame, made in two sections, connected together by a horizontal pivot, one section overlapping the other, an axle below the pivot, and springs connecting the axle and that frame which overlaps.

2. A vehicle having a two section horizontally hinged frame, with supporting wheels for the hinged portion, steering wheels at each end and connecting means for the two steering wheels for turning them in synchronism, the said connecting means having compensating mechanism whereby a uniform tension will be had on the connecting means, irrespective of the non-horizontal alinement of the frame.

3. A vehicle having a two section frame, secured together by a horizontal pivot extending crosswise of the frame, the two sections being normally in alinement, and a supporting axle below the pivot.

4. A vehicle having a two section frame, connected together by a horizontal pivot, pedestal guides depending from one section of the frame, and wheels below the pivot supporting such guides.

5. A vehicle having center wheels and a two section frame, connected together with a horizontal pivot, pedestal guides depending from the frame sections below the pivot, and engaging with the wheels, the pivot being a horizontal tube, to which the two sections are pivotally connected.

This specification signed and witnessed this tenth day of March, 1909.

JOHN M. LANSDEN, Jr.

Witnesses:
JOHN MILLIKEN,
G. S. FREEMAN.